United States Patent
Jungclaus et al.

(10) Patent No.: US 9,173,520 B2
(45) Date of Patent: Nov. 3, 2015

(54) BEVERAGE PREPARING DEVICE

(71) Applicant: Miele & Cie. KG, Guetersloh (DE)

(72) Inventors: Dirk Jungclaus, Oelde (DE); Ulrich Van Pels, Rheda-Wiedenbrueck (DE)

(73) Assignee: MIELE & CIE. KG, Guetersloh (DE)

( * ) Notice: Subject to any disclaimer, the term of this patent is extended or adjusted under 35 U.S.C. 154(b) by 376 days.

(21) Appl. No.: 13/688,248

(22) Filed: Nov. 29, 2012

(65) Prior Publication Data

US 2013/0139927 A1  Jun. 6, 2013

(30) Foreign Application Priority Data

Dec. 1, 2011 (EP) .................................... 11401652

(51) Int. Cl.
  *A47J 31/58*   (2006.01)
  *A47J 31/44*   (2006.01)

(52) U.S. Cl.
  CPC .............. *A47J 31/58* (2013.01); *A47J 31/4482* (2013.01)

(58) Field of Classification Search
  CPC ...... H01H 21/54; A47J 31/58; A47J 31/4482; B67D 7/12
  USPC .................... 141/94, 250, 266, 279, 284
  See application file for complete search history.

(56) References Cited

U.S. PATENT DOCUMENTS

| | | | |
|---|---|---|---|
| 3,799,219 A * | 3/1974 | Uth et al. | 141/39 |
| 3,950,719 A * | 4/1976 | Maxwell | 335/205 |
| 4,437,497 A * | 3/1984 | Enander | 141/1 |
| 5,129,548 A * | 7/1992 | Wisniewski | 222/16 |
| 5,129,549 A * | 7/1992 | Austin | 222/129.1 |
| 5,216,462 A * | 6/1993 | Nakajima et al. | 399/27 |
| 5,507,329 A * | 4/1996 | Shub | 141/351 |
| 5,546,996 A * | 8/1996 | Broyles et al. | 141/18 |
| 6,966,457 B1 * | 11/2005 | Torbet | 222/102 |
| 7,353,850 B2 * | 4/2008 | Greiwe et al. | 141/279 |
| 7,654,192 B2 * | 2/2010 | Oehninger | 99/280 |
| 7,707,927 B2 | 5/2010 | Boussemart et al. | |
| 2004/0084475 A1 * | 5/2004 | Bethuy et al. | 222/1 |

(Continued)

FOREIGN PATENT DOCUMENTS

DE    202005011476 U1   10/2005
DE   10 2008 029 835    * 12/2009
EP         1656863 A1    5/2006

(Continued)

OTHER PUBLICATIONS

European Patent Office, Extended European Search Report in European Patent Application No. 11 40 1652 (Mar. 21, 2012).

*Primary Examiner* — Timothy L Maust
*Assistant Examiner* — Andrew Stclair
(74) *Attorney, Agent, or Firm* — Leydig, Voit & Mayer, Ltd.

(57) ABSTRACT

A beverage preparing device includes a beverage outlet that is vertically adjustable and is adapted to dispense a beverage into a receptacle. The beverage outlet has a safety device including a safety switch or safety sensor for interrupting height adjustment of the beverage outlet when the beverage outlet approaches or contacts the receptacle. An actuating member is pivotable about a joint so as to activate the safety switch or safety sensor. The actuating member includes a contact surface adapted to activate the safety switch or safety sensor and an additional contact surface for interrupting the height adjustment of the beverage outlet when an upper end position of the beverage outlet is reached.

18 Claims, 6 Drawing Sheets

(56) References Cited

U.S. PATENT DOCUMENTS

2006/0108023 A1* 5/2006 Greiwe et al. ................ 141/369
2007/0031558 A1* 2/2007 Lussi ............................ 426/520

FOREIGN PATENT DOCUMENTS

EP 2454975 A1 * 5/2012
EP 2454977 A1 * 5/2012

* cited by examiner a)

b)

BEVERAGE PREPARING DEVICE

CROSS REFERENCE TO RELATED APPLICATIONS

This application claims priority to European Patent Application No. EP 11 401 652.0, filed Dec. 1, 2011, which is hereby incorporated by reference herein in its entirety.

FIELD

The present invention relates to a beverage preparing device with a beverage outlet that is vertically adjustable.

BACKGROUND

Beverage preparing devices of the type concerned here can be used for different applications. A preferred use of a beverage preparing device is as an automatic coffee maker. Such beverage preparing devices generally have a beverage outlet which is vertically adjustable by an actuator and adapted to dispense a beverage into at least one receptacle. Beverage preparing devices that allow the beverage outlet to be adjusted in height, either manually or by the actuator mentioned, are already in use. In most cases, an electric motor is used as the actuator, but other actuators may also be used, such as pneumatic, electromagnetic or hydraulic actuators. The beverage outlet is moved by the actuator or manually toward the receptacle to a point where adequate splash protection is provided, which is generally the case when the beverage outlet rests on the edge of the receptacle or is located closely above it. In this position, the dispensing nozzles of the beverage outlet open directly into the receptacle, which has the advantage that no splashing can occur during the dispensing of the beverage and, especially when preparing coffee, that the formation of foam (crema) is improved.

However, it is also known to equip the beverage outlet with a safety device including, for example, a safety switch or safety sensor for interrupting the height adjustment of the beverage outlet, the safety switch or safety sensor being activated when the beverage outlet approaches or contacts the receptacle. In an advantageous mechanical variant of an embodiment, there is provided an actuating member capable of pivoting about a joint and having a contact surface that activates the safety switch, so that upon contact of the actuating member with the edge of the receptacle, the above-mentioned safety switch causes an interruption of the forward movement of the beverage outlet. The safety switched used for this purpose is a microswitch. The described approach is very advantageous with respect to the above-mentioned splash protection and, in addition, prevents unwanted tilting of the receptacle. However, here, only one of two end positions of the beverage outlet is detected.

SUMMARY

In an embodiment, the present invention provides a beverage preparing device includes a beverage outlet that is vertically adjustable and is adapted to dispense a beverage into a receptacle. The beverage outlet has a safety device including a safety switch or safety sensor for interrupting height adjustment of the beverage outlet when the beverage outlet approaches or contacts the receptacle. An actuating member is pivotable about a joint so as to activate the safety switch or safety sensor. The actuating member includes a contact surface adapted to activate the safety switch or safety sensor and an additional contact surface for interrupting the height adjustment of the beverage outlet when an upper end position of the beverage outlet is reached.

BRIEF DESCRIPTION OF THE DRAWINGS

Exemplary embodiments of the present invention are described in more detail below with reference to the drawings, in which.

DETAILED DESCRIPTION

Figure 1:
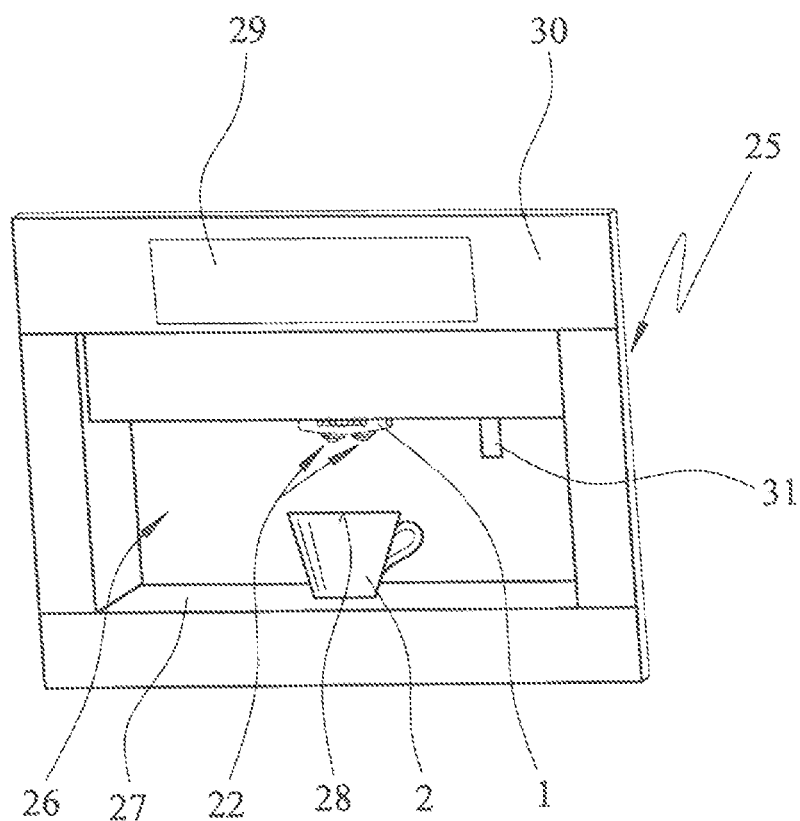
FIG. 1 shows a portion of a beverage preparing device, such as may be used as a built-in unit a kitchen cabinet.

In an embodiment, the present invention provides a beverage preparing device whose beverage outlet is movable between two end positions and capable of being brought to a standstill in the respective end positions by suitable means, and to achieve this by providing a solution which overall can be implemented in a simple manner without a high degree of complexity.

A beverage preparing device having a beverage outlet which is vertically adjustable and adapted to dispense a beverage into at least one receptacle, said beverage outlet having a safety device including a safety switch or safety sensor for interrupting the height adjustment of the beverage outlet when it approaches or contacts the receptacle, and provision being made for an actuating member capable of pivoting about a joint for activating the safety switch or safety sensor, and for a contact surface that activates the safety switch or safety sensor, is improved, according to the present invention, such that the actuating member has an additional contact surface for interrupting the height adjustment of the beverage outlet when an upper end position of the beverage outlet is reached.

Advantageously, in an embodiment, the present invention provides a very simple way of defining, for the beverage outlet, a lower end position near the receptacle as well as an upper end position, so that striking contact of the beverage outlet in the upper or lower end position can be effectively prevented. This makes it possible, for example, to provide effective protection against tilting of the receptacle. The present invention can be used for actuator-driven variants of beverage outlets. It is a special feature of the present invention that only one actuating member is used which, having an additional contact surface, enables stoppage in both the lower and upper end positions, and thus, serves several functions at the same time Until now, several safety switches or safety sensors were required for this purpose. In the approach presented here, it is possible to use a single safety switch or safety sensor, which also leads to a considerable simplification, and thus, a reduction in cost.

It goes without saying that the safety switch, respectively the safety sensor, can be provided both on the actuating member and the beverage outlet, while the first contact surface is disposed opposite the safety switch, respectively the safety sensor.

In an embodiment of the present invention, the actuating member is a lever arm or a rocker. This proposal has the decisive advantage of providing a particularly simple mechanical design for the actuating member and, in addition, allows space-saving integration into the beverage preparing device, while at the same time enabling the earlier mentioned double function of the actuating member to be implemented in a suitable manner.

In addition, another proposal is to dispose the axis of rotation of the joint between the two contact surfaces. In other words, for example, the actuating member has a first contact surface defining the lower end position of the beverage outlet and a second contact surface defining the upper end position of the beverage outlet, the joint being located therebetween. This special arrangement allows the object of the present invention to be achieved in connection with a single safety switch or safety sensor, respectively.

In an advantageous embodiment of the present invention, the safety switch may be mechanical in design, such as, for example, a microswitch.

In addition, it is possible to use an optical or magnetic sensing element as the safety sensor, so that at least one of the contact surfaces is designed as a corresponding signal source. For example, if a magnetic safety sensor is used, such sensor could be a Hall-effect sensor that responds to the approach of a ferromagnetic contact surface which acts as a signal source and may be integrated directly into the actuating member or attached to the surface thereof. The electronic circuit required to implement the deactivation of the actuator is a simple implementation and is available to those skilled in the art. The same is similarly true for an optical safety sensor.

However, the present invention covers also the opposite case, where the safety sensor is an optical or magnetic signal source, so that at least one of the contact surfaces is provided by a corresponding sensing element.

In an advantageous embodiment of the present invention, the upper end position of the beverage outlet may be defined by a stop flange. Thus, when the beverage outlet moves toward the upper end position, the second contact surface provided on the actuating member comes directly into contact with this stop flange, is pivoted about the joint, whereupon it actuates the safety switch or activates the safety sensor, respectively, as a result of which the actuator is deactivated, and thus the movement of the beverage outlet is stopped. Thus, the approach of the present invention can be implemented by this simple mechanical feature.

Moreover, it is a decisive advantage if the actuating member can be pivoted about the joint against the restoring force of a spring. The spring providing the restoring force ensures that the actuating member always returns to its initial neutral position while the beverage outlet is moving. Because of this, it is always possible to accurately define the switching instant, which ultimately defines the end positions of the beverage outlet.

In particular, when heated beverages are prepared in a beverage preparing device according to the present invention, hot steam may escape after the receptacle is filled with the beverage, causing condensation residues in the region of the beverage outlet, on its dispensing nozzles, and in particular on the actuating member. If the actuating member is inseparably attached to the beverage preparing device, these condensation residues, as well as any beverage splatters that may adhere to the actuating member, can be removed only with considerable effort. However, for reasons of appearance and hygiene, it is recommendable and desirable to regularly clean the dispensing area. Therefore, it is particularly advantageous if the actuating member is designed as a removable unit. The removable design of the actuating member greatly simplifies the cleaning of the actuating member and the entire dispensing area.

In another embodiment of the present invention, it is further provided that the rocker-type actuating member has two trunnions which are inserted in corresponding bearings of the beverage outlet. Each of the two trunnions forms part of a respective joint, which allows for a very stable and reliable mounting of the actuating member.

Accordingly, the joint may be formed by the trunnions each being received in a respective bearing block of the beverage outlet. According to a further idea of this approach, the bearing blocks may have an elastically deformable portion, so that the removal of the actuating member is significantly simplified.

It is also particularly advantageous for the bearing arrangement if the trunnions have a spherical surface and if the corresponding bearings in the bearing blocks each take the form of a spherical bearing shell. The so-created ball-and-socket joints provide a low-friction, easy-running bearing for the actuating member.

An advantageous measure to fix the actuating member is to provide a locking lever for each trunnion, such that the trunnions are secured in their bearings from being automatically and unintentionally released from the bearings. This is particularly important if the actuating member is removably mounted in the beverage outlet.

According to another idea, in order to facilitate the mounting and removal of the actuating member, it is proposed that the trunnions, or at least portions thereof, be elastically deformable themselves. A thereby provided movability of the trunnions is also advantageous because it makes it possible to achieve a contact pressure which enhances the integrity of the joint without the need for additional measures. In this case, the elastic portions of the bearing blocks may be dispensed with.

If the rocker-type actuating member has a recess for each of the dispensing nozzles provided on the beverage outlet, then the actuating member may be arranged around the dispensing nozzles, thereby ensuring that a receptacle to be filled will with certainty be engaged by the actuating member, even if it may not have been accurately placed onto the intended position. In this way, moreover, the actuating member may be used as a screen to conceal the inner components of the beverage preparing device, and thus serves to give the beverage preparing device a pleasing appearance and design.

Making the actuating member from plastic has the important advantage that the actuating member can be produced as a single piece in a cost-effective and altogether simple way. Therefore, it is proposed that the actuating member be molded from plastic as a single piece. In the process, the trunnions or the contact surface, for example, may be integrally formed directly on the actuating member, thus eliminating the need for additional manufacturing steps.

An exemplary embodiment of the present invention will be described hereafter in greater detail with reference to the accompanying drawings. The example shown in the drawings and described in the following is merely intended to illustrate features of the present invention, but should not be construed as limiting it to the variant shown. Identical or similar components are denoted by the same reference numerals. For the sake of illustrating the operating principle of the present invention, the figures are greatly simplified schematic views in which components not essential to the invention have been omitted. However, this does not mean that such components are not present in a solution according to the present invention.

The view of FIG. 1 shows a portion of a beverage preparing device, such as may be used, for example, as a built-in unit in a kitchen cabinet. The device shown is an automatic coffee maker. Many variants of such beverage preparing devices are known and already in use.

The beverage preparing device shown in FIG. 1 has a door 25 in which is formed a bay-shaped beverage dispensing area 26. The bottom of beverage dispensing area 26 is formed by a drip tray 27 on which, in this case, a single receptacle 2 is placed. Located above receptacle 2 is a beverage outlet 1 which, in the embodiment shown in FIG. 1, is in its upper end position, so that it is completely concealed behind the cover provided on door 25 for this purpose. Two spaced-apart dispensing nozzles 22 for dispensing the beverage are provided on beverage outlet 1 on the side facing receptacle 2. It is possible to fill only one receptacle 2 with a beverage, as in the present case, or to use one dispensing nozzle 22 for one receptacle each, so that a total of two receptacles can be filled with a beverage simultaneously. In the opposite, lower end position, beverage outlet 1 is lowered to the point where dispensing nozzles 2 are located immediately above receptacle edge 28 or dips slightly into receptacle 2. A discharge nozzle 31 is disposed laterally adjacent to beverage outlet 1 within bay-shaped beverage dispensing area 26. In an automatic coffee maker, for example, this nozzle is used for dispensing hot water.

Further, a panel 30 of the beverage preparing device has a display 29 which is used for displaying required information and/or for entering the data required for the preparation of beverages.

Figure 2:
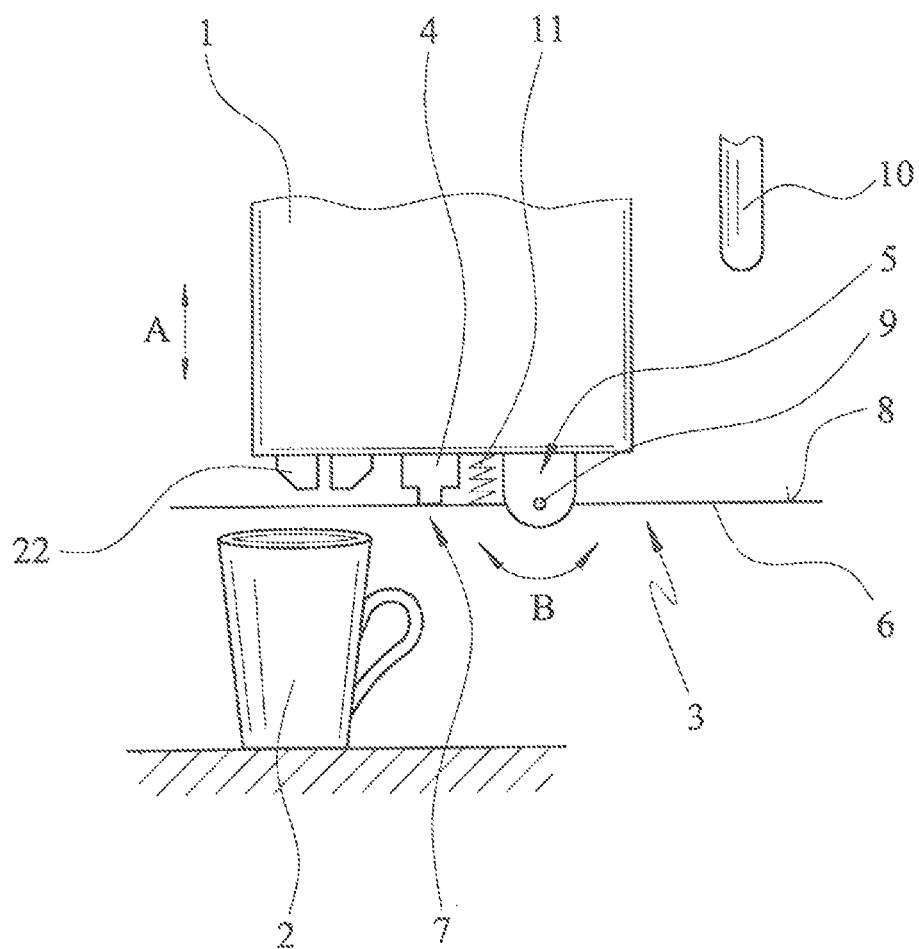
FIG. 2 illustrates, in greatly simplified form, features of the present invention.

In FIG. 2, an embodiment of a beverage preparing device according to the present invention is shown in greatly simplified form. Beverage outlet 1 can be moved back and forth between an upper and a lower end position in the direction of double-headed arrow A. The adjustment is accomplished by an electric motor actuator. Beverage outlet 1 is provided underneath with a dispensing nozzle 22 for dispensing a beverage into receptacle 2 located therebelow. A safety device generally designated 3 is, in the present case, formed of a microswitch 4 and an actuating member 6 which is in the form of a rocker and, by means of a joint 5, is capable of pivoting in the direction of double-headed arrow B about an axis of rotation 9. Actuating member 6 is further provided with two contact surfaces 7, 8 on the side facing beverage outlet 1. In this case, contact surface 7 directly engages the corresponding side of microswitch 4 and activates it upon further downward movement of beverage outlet 1, so that the height adjustment of beverage outlet 1 is stopped when actuating member 6 comes into contact with edge 28 of receptacle 2. At its opposite end, the actuating member is extended beyond joint 5 and is provided with an additional contact surface 8 in this portion. The additional contact surface is also located on the upper side of actuating member 6. When beverage outlet 1 is in the shown lower end position, the additional contact surface does not perform any function. As will be described later herein, it forms an operative connection with a stop flange 10 designed as a pusher.

It should also be noted with reference to FIG. 2 that a spring 11 is disposed near joint 5 between beverage outlet 1 and actuating member 6 to return actuating member 6 to an initial neutral position when the beverage outlet is not in any of its end positions. This spring may, of course, also form a unit with the safety switch or safety sensor 4, or be incorporated therein.

Figure 3:
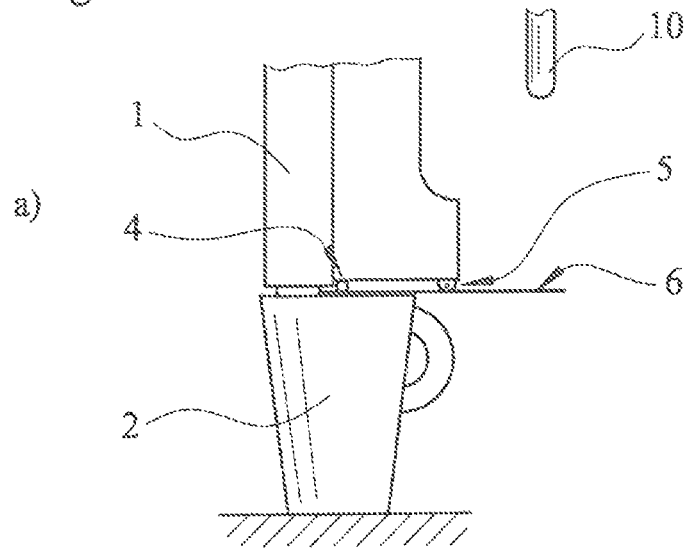
FIG. 3 shows, in greatly simplified form, the lower end position of the beverage outlet in part (a) and the upper end position of the beverage outlet in part (b)
Figure 3:
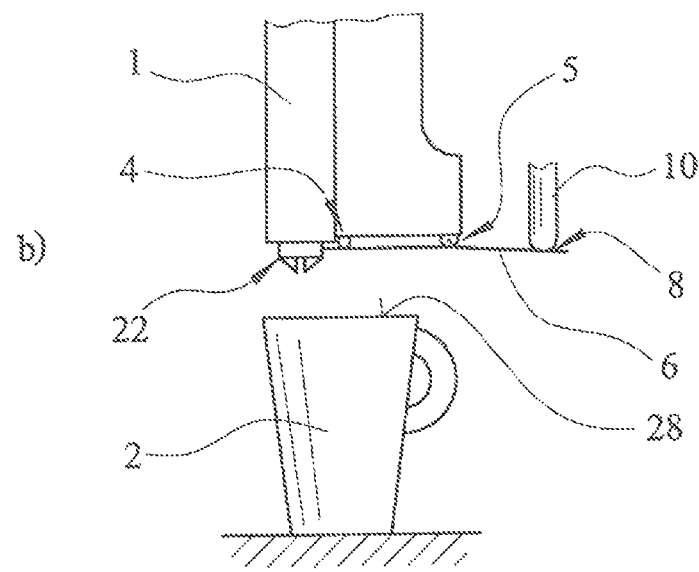

FIG. 3 illustrates in each of two parts (a) and (b) a different end position of beverage outlet 1. Part (a) of the figure shows the lower end position and part (b) shows the upper end position of beverage outlet 1.

It can be seen in part (a) of the figure that as beverage outlet 1 moves downwardly, the underside of the actuating member 6, which is in the form of a rocker and is pivotable about joint 5, contacts the edge 28 of receptacle 2. As a result, the microswitch 4 located above actuating member 6 is activated and stops the height adjustment of beverage outlet 1, whereupon a beverage may be filled into receptacle 2 via dispensing nozzle 22.

In contrast, part (b) of the figure shows the upper end position of beverage outlet 1, where there is a distance between the underside of beverage outlet 1 and edge 28 of receptacle 2, so that receptacle 2 can be removed without difficulty. The position of beverage outlet 1 substantially corresponds to that represented in FIG. 1, but here the stop flange 10 designed as a pusher is in contact with contact surface 8 of actuating member 6, thus causing the actuating member 6 to pivot about joint 5. As a result, microswitch 4 is activated, thereby interrupting the downward movement of beverage outlet 1.

Figure 4:
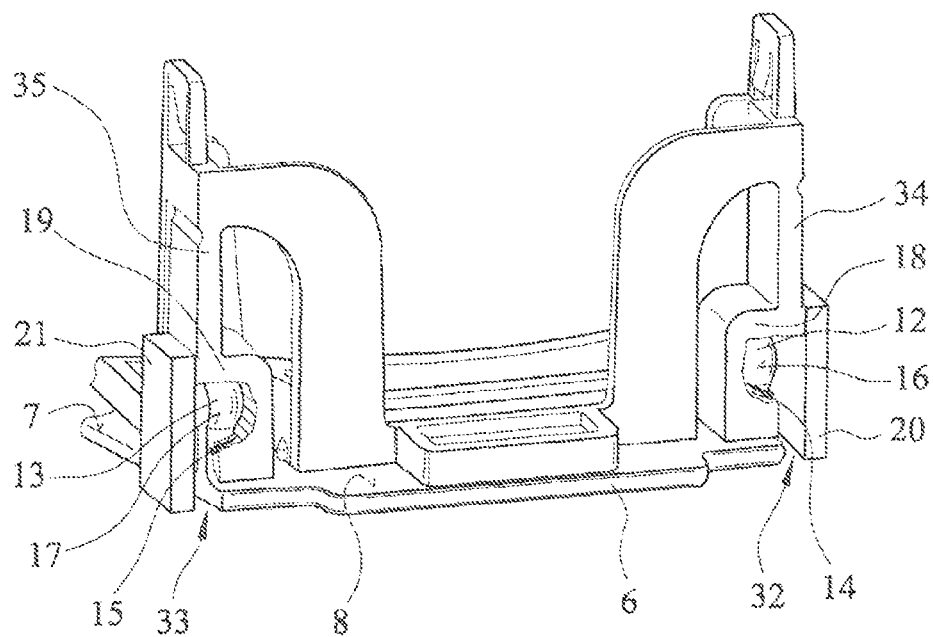
FIG. 4 shows a portion of a beverage preparing device as seen from the inside, showing an actuating member in the form of a rocker.

FIG. 4 provides a partial view of a beverage preparing device as seen from the inside, showing an actuating member 6 in the form of a rocker. Actuating member 6 is molded from plastic as a single piece and, in the present case, forms a rocker having contact surfaces 7 and 8. Trunnions 12 and 13 are integrally formed on the sides of actuating member 6, said trunnions having a spherical surface 16 and 17, respectively (see also FIG. 5). Trunnions 12, 13 are inserted with their spherical surfaces 16, 17 in corresponding bearings 14, 15, thereby forming a joint 5 about which actuating member 6 may be pivoted. Molding actuating member 6 as a single piece from plastic also allows the trunnions 12, 13 to be elastic, which provides the advantage of an optimized; i.e., low-friction bearing arrangement. Bearings 14, 15 form part of respective bearing blocks 18, 19 which, on their sides facing away from actuating member 6, merge into respective elastic portions 34 and 35, respectively. Elastic portions 34, 35 are adapted to be compressed and thereby elastically deformed toward each other, so that the openings 32, 33 located in the low area of bearing block 18, respectively 19, allow actuating member 6 to be completely removed. In order to prevent actuating member 6 from being automatically and unintentionally released, bearings 14, 15 of trunnions 12, 13 are each covered by a locking lever 20, 21 on their otherwise open exterior sides. When this locking lever 20, 21 is moved to a position which clears the bearings 14, 15, elastic portions 34, 35 of bearing blocks 18, 19 may then be deformed in the above-described manner in order to remove actuating member 6.

In another variant of an embodiment, locking levers 20, 21 may be used to deform elastic portions 34, 35 of bearing blocks 18, 19. In this case, the idea is rather to integrally form locking levers 20, 21 directly on bearing blocks 18, 19, and to provide an opening 32, 33 between the outer surface of trunnions 12, 13 and locking levers 20, 21, respectively, which, when pressure is exerted on locking levers 20, 21, cause said elastic deformation of elastic portions 34, 35. In this variant, trunnions 12, 13 may also be rigid; i.e., not elastic.

Figure 5:
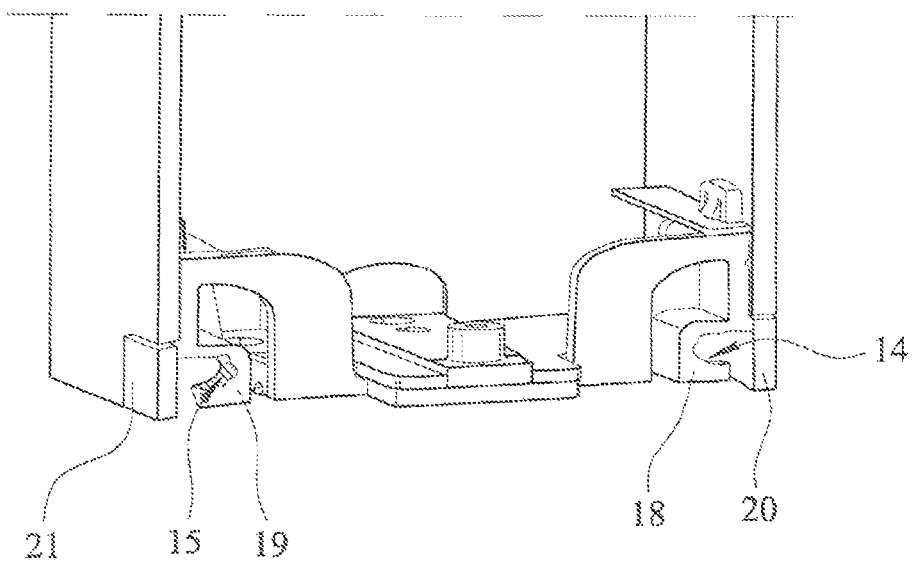
FIG. 5 shows a portion of a beverage preparing device as seen from the inside, without the actuating member inserted.

FIG. 5 shows an inside view of a portion of a beverage preparing device according to the present invention, as already described in connection with FIG. 4, but here actuating member 6 has been removed from bearings 14, 15. Thus, FIG. 5 provides a better view into spherical bearings 14 and 15.

Figure 6:
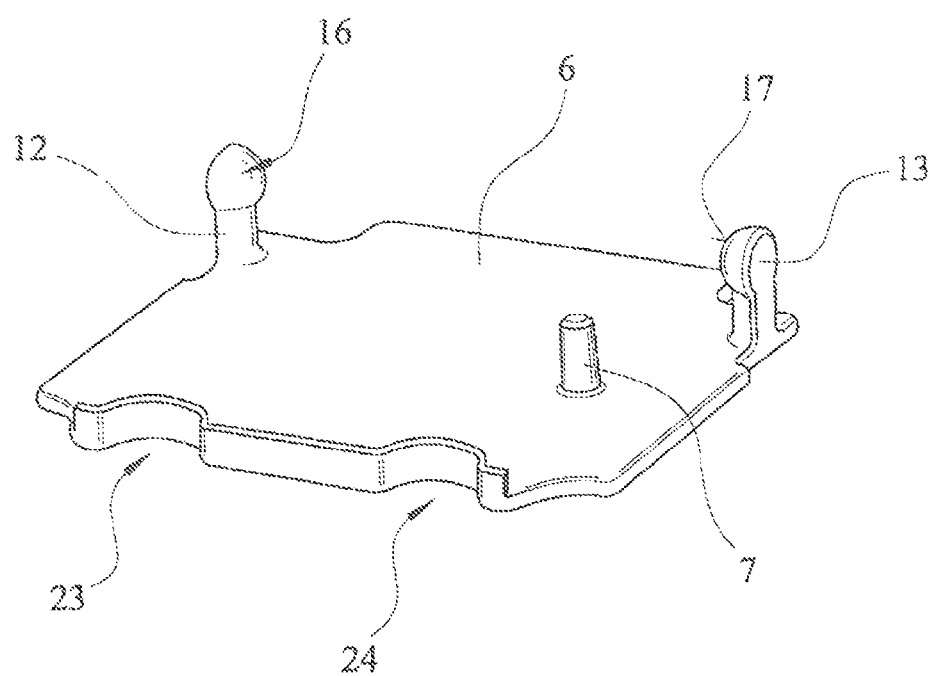
FIG. 6 shows a detail perspective view of an actuating member in the form of a rocker.

Finally, FIG. 6 shows an actuating member 6 according to the present invention in a perspective detail view. Clearly shown are the trunnions 12 and 13 integrally formed on the sides of actuating member 6, which is in the form of a rocker. The upper portions of trunnions 12 and 13 are shaped as a spherical surface 16 or 17, respectively. The front portion of the actuating member; i.e., the portion facing the dispensing nozzles 22 of beverage outlet 1, has two recesses 23 and 24 for passage therethrough of the dispensing nozzles 22 of beverage outlet 1. In this embodiment, moreover, contact surface 7 takes the form as a pusher integrally formed on actuating member 6.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 1 beverage outlet
2 receptacle
3 safety device
4 safety switch or safety sensor
5 joint
6 actuating member
7 contact surface
8 contact surface
9 axis of rotation
10 stop flange
11 spring
12 trunnion
13 trunnion
14 bearing
15 bearing
16 surface
17 surface
18 bearing block
19 bearing block
20 locking lever
21 locking lever
22 dispensing nozzle
23 recess
24 recess
25 door
26 beverage dispensing area
27 drip tray
28 receptacle edge
29 display
30 panel
31 discharge nozzle
32 opening
33 opening
34 elastic portion (of the bearing block)
35 elastic portion (of the bearing block)

What is claimed is:

1. A beverage preparing device comprising:
a beverage outlet that is vertically adjustable and is adapted to dispense a beverage into a receptacle, the beverage outlet having a safety device including a safely switch or safety sensor for interrupting both an upward and a downward height adjustment of the beverage outlet; and
an actuating member that is pivotable about a joint so as to activate the safety switch or safety sensor, the actuating member including a contact surface adapted to activate the safety switch or safety sensor to interrupt the downward height adjustment of the beverage outlet when the contact surface comes into contact with receptacle and an additional contact surface adapted to activate the safety switch or safety sensor for interrupting the upward height adjustment of the beverage outlet when an upper end position of the beverage outlet is reached.

2. The beverage preparing device as recited in claim 1, wherein the actuating member us a lever arm or rocker.

3. the beverage preparing device as recited in claim 1, wherein an axis of rotation of the joint is disposed between the two contact surfaces.

4. The beverage preparing device as recited in claim 1, wherein the safety device includes the safety switch, the safety switch being a mechanical sensing element.

5. The beverage preparing device as recited in claim 1, wherein the safety device includes the safety sensor, the safety sensor being an optical or magnetic sensing element and at least one of the contact surfaces includes a corresponding signal source.

6. The beverage preparing device as recited in claim 1, wherein the safety device includes the safety sensor, the safety sensor being an optical or magnetic signal source and at least one of the contact surfaces includes a corresponding sensing element.

7. The beverage preparing device as recited in claim 1, wherein the safety device includes the safety switch, the safety switch being a mechanical microswitch.

8. The beverage preparing device as recited in claim 1, wherein the upper end position of the beverage outlet is defined by a stop flange.

9. The beverage preparing device as recited in claim 1, wherein the actuating member is pivotable about the joint against the restoring force of a spring.

10. The beverage preparing device as recited in claim 1, wherein the actuating member is a removable unit.

11. The beverage preparing device as recited in claim 2, wherein one of the actuating member and beverage outlet has at least two trunnions inserted in corresponding bearings of the other of the actuating member and beverage outlet.

12. The beverage preparing device as recited in claim 11, wherein the trunnions are each received in a respective bearing block of the beverage outlet.

13. The beverage preparing device as recited in claim 12, wherein the bearing blocks have an elastically deformable portion.

14. The beverage preparing device as recited in claim 12, wherein the trunnions have a spherical surface and the corresponding bearings in the bearing blocks each take the form of a spherical bearing shell.

15. The beverage preparing device as recited in claim 11, wherein the trunnions are secured in the respective bearings by a respective locking lever from being automatically released from the bearings.

16. The beverage preparing device as recited in claim 11, wherein at least a portion of the trunnions is elastically deformable.

17. The beverage preparing device as recited in claim 2 wherein the actuating member has a recess for one or more dispensing nozzles provided on the beverage outlet.

18. The beverage preparing device as recited in claim 1, wherein the actuating member is entirely molded from plastic.

* * * * *